United States Patent
Rakshit et al.

(10) Patent No.: US 10,607,500 B1
(45) Date of Patent: Mar. 31, 2020

(54) PROVIDING BACKGROUND MUSIC TEMPO TO ACCOMPANY PROCEDURAL INSTRUCTIONS

(71) Applicant: International Business Machines Corporation, Armonk, NY (US)

(72) Inventors: Sarbajit K. Rakshit, Kolkata (IN); Martin G. Keen, Cary, NC (US); John M. Ganci, Jr., Raleigh, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/418,042

(22) Filed: May 21, 2019

(51) Int. Cl.
*G10H 1/40* (2006.01)
*G09B 15/00* (2006.01)
*G06F 16/9035* (2019.01)
*G06F 3/16* (2006.01)

(52) U.S. Cl.
CPC ............. *G09B 15/00* (2013.01); *G06F 3/165* (2013.01); *G06F 16/9035* (2019.01)

(58) Field of Classification Search
CPC ....... G10H 2210/076; G10H 2210/066; G10H 2210/081; G10H 1/0025; G10H 2210/071; G10H 2210/381; G01L 9/008; G01L 5/0052
See application file for complete search history.

(56) References Cited

U.S. PATENT DOCUMENTS

| | | | |
|---|---|---|---|
| 7,667,120 B2 | 2/2010 | Suriano | |
| 8,428,758 B2 | 4/2013 | Naik | |
| 8,930,191 B2 | 1/2015 | Gruber | |
| 2001/0039872 A1* | 11/2001 | Cliff | G10H 1/0033 84/609 |
| 2008/0190272 A1* | 8/2008 | Taub | G10H 1/0058 84/645 |
| 2010/0282045 A1* | 11/2010 | Chen | G10H 1/40 84/612 |
| 2013/0297599 A1 | 11/2013 | Henshall | |
| 2016/0165038 A1 | 6/2016 | Lim | |
| 2018/0121432 A1 | 5/2018 | Parson | |
| 2019/0005935 A1* | 1/2019 | Sasai | G10L 25/54 |

* cited by examiner

*Primary Examiner* — Marlon T Fletcher
(74) *Attorney, Agent, or Firm* — Edward J. Wixted, III

(57) ABSTRACT

In an approach to determining a background music tempo, one or more computer processors receive a request from a user. The one or more computer processors determine a response to the request will include an action to be performed by the user. The one or more computer processors determine a ranking of one or more instruction characteristics associated with a first instruction. The one or more computer processors predict a performance of the first instruction by the user. Based on the determined ranking and the predicted performance of the first instruction by the user, the one or more computer processors determine a beats per minute range for music to accompany performance of the first instruction. The one or more computer processors render the first instruction and background music associated with the first instruction, where the background music is at the determined beats per minute range.

20 Claims, 5 Drawing Sheets

```
    {
310 ~ "categories": [
      {
  312 ~ "score": 0.594296,
  314 ~ "label": "/technology and computing/software"
      },
316 ~ "language": "en"
    }
```

FIG. 3A

```
    {
318 ~ "text": "Blockchain configuration",
320 ~ "relevance": 0.839578,
322 ~ "dbpedia_resource":
324 ~ "http://dbpedia.org/resource/Blockchain"
    }
```

FIG. 3B

```
326 —— "entities": [
        {
    328 —— "type": "Company",
    330 —— "text": "BankA",
    332 —— "sentiment": {
      334 —— "score": 0.0,
      336 —— "label": "neutral"
        },
    338 —— "relevance": 0.784947,
    340 —— "disambiguation": {
      342 —— "subtype": [
        344 —— "FinancialInstitution",
        346 —— "CommercialLender",
        ],
```

FIG. 3C

```
348 —— "keywords": [
        {
    350 —— "text": "node configuration",
    352 —— "sentiment": {
      354 —— "score": 0.343445
        },
    356 —— "relevance": 0.662324,
        }
        },
```

FIG. 3D

PROVIDING BACKGROUND MUSIC TEMPO TO ACCOMPANY PROCEDURAL INSTRUCTIONS

BACKGROUND OF THE INVENTION

The present invention relates generally to the field of analytics, and more particularly to providing background music tempo to accompany procedural instructions.

The tempo of background music has a demonstrable effect on a person's productivity, error rate, tension, and alertness. Fast tempo music, often referred to as "allegro," has beats per minute (bpm) ranging from 120-168, whereas slow tempo music has bpm lower than 120. The tempo of background music has been studied to determine its effect on tasks related to task productivity, spatial reasoning, and reading comprehension. Fast tempo background music has been observed to enhance task productivity, spatial reasoning, and reading performance. Low tempo background music has been observed to reduce task error rates, user tension levels, and reading efficiency.

Digital assistants, as known in the art, can provide procedural instructions to users. For example, a digital assistant can provide a series of instructions to navigate to a location, follow a recipe, or fix a flat tire. Typically, a digital assistant receives and processes commands or requests via one or more natural language processing techniques. In addition, a digital assistant may act as a home automation hub via connection to a plurality of smart devices, often referred to as the Internet of Things (IoT).

SUMMARY

Embodiments of the present invention disclose a method, a computer program product, and a system for determining a background music tempo. The method may include one or more computer processors receiving a request from a user. The one or more computer processors determine a response to the request will include an action to be performed by the user. The one or more computer processors determine a ranking of one or more instruction characteristics associated with a first instruction. The one or more computer processors predict a performance of the first instruction by the user. Based on the determined ranking of the one or more instruction characteristics associated with the first instruction and the predicted performance of the first instruction by the user, the one or more computer processors determine a beats per minute range for music to accompany performance of the first instruction. The one or more computer processors render the first instruction and background music associated with the first instruction, wherein the background music is at the determined beats per minute range.

BRIEF DESCRIPTION OF THE DRAWINGS

FIG. 3A depicts sample code for determining instructions related to software;

FIG. 3B depicts sample code for determining concepts related to blockchain;

FIG. 3C depicts sample code for determining entities related to a banking sector;

FIG. 3D depicts sample code for extracting keywords related to node configuration.

DETAILED DESCRIPTION

The tempo of background music can influence the performance of a task by a user with respect to various performance characteristics. These characteristics include, but are not limited to, productivity, quality control, comprehension, tension level, and spatial reasoning. Embodiments of the present invention recognize that improvement in the performance of a task by a user may be gained by providing background music at a specific tempo range for the duration of the task. Implementation of embodiments of the invention may take a variety of forms, and exemplary implementation details are discussed subsequently with reference to the Figures.

As referred to herein, all data retrieved, collected, and used, with regards to a user, is used in an opt in manner, i.e., the user has given permission for the data to be used. Any data or information used for which the user has not opted in is data that is publicly available. In some embodiments, the user can be notified when data collection occurs.

Figure 1:
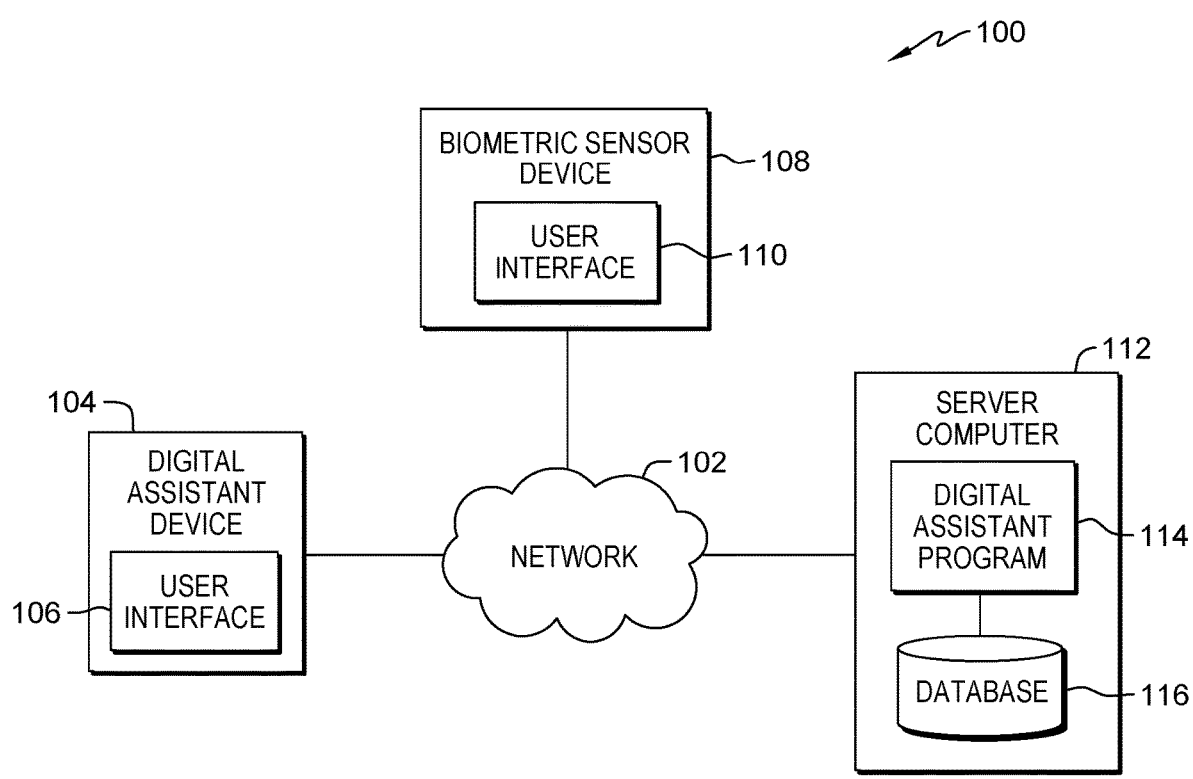
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes digital assistant device 104, biometric sensor device 108, and server computer 112, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between digital assistant device 104, biometric sensor device 108, and server computer 112, and other computing devices (not shown) within distributed data processing environment 100.

Digital assistant device 104 and biometric sensor device 108 can each be a laptop computer, a tablet computer, a smart phone, smart watch, a smart speaker, or any programmable electronic device capable of communicating with various components and devices within distributed data processing environment 100, via network 102. Digital assistant device 104 and biometric sensor device 108 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In general, digital assistant device 104 and biometric sensor device 108 each represents one or more programmable electronic devices or combination of programmable electronic devices capable of executing machine readable program instructions and communicating with other computing devices (not shown) within distributed data processing environment 100 via a network, such as network 102. Digital assistant device 104 and biometric sensor device 108 each represents one or more devices associated with a user. Digital assistant device 104 includes an instance of digital assistant user interface 106. Biometric sensor device 108 includes an instance of user interface 110. In one embodiment, biometric sensor device 108 is integrated into digital assistant device 104, i.e., the two comprise a single device. In an embodiment, biometric sensor device 108 collects biometric data including, but not limited to blood pressure, heart rate, respiratory rate, calories burned, calories consumed, pulse, oxygen levels, blood oxygen level, glucose level, blood pH level, salinity of user perspiration, skin temperature, galvanic skin response, electrocardiography (ECG or EKG) data, body temperature, eye tracking data, etc.

User interface 106 enables a user to make requests of or issue commands to digital assistant device 104 and receive information and instructions in response. In one embodiment, a user of digital assistant device 104 accesses user interface 106 via voice commands in natural language. User interface 110 enables a user of biometric sensor device 108 to access biometric data collected by biometric sensor device 108. In one embodiment, a user of biometric sensor device 108 can enter values of biometric data, via user interface 110, into biometric sensor device 108. In one embodiment, user interface 106 and user interface 110 may each be graphical user interfaces (GUI) or web user interfaces (WUI) and can display text, documents, web browser windows, user options, application interfaces, and instructions for operation, and include the information (such as graphic, text, and sound) that a program presents to a user and the control sequences the user employs to control the program. In another embodiment, user interface 106 and user interface 110 may also be mobile application software. In an example, mobile application software, or an "app," is a computer program designed to run on smart phones, tablet computers and other mobile devices.

Server computer 112 can be a standalone computing device, a management server, a web server, a mobile computing device, or any other electronic device or computing system capable of receiving, sending, and processing data. In other embodiments, server computer 112 can represent a server computing system utilizing multiple computers as a server system, such as in a cloud computing environment. In another embodiment, server computer 112 can be a laptop computer, a tablet computer, a netbook computer, a personal computer (PC), a desktop computer, a personal digital assistant (PDA), a smart phone, or any programmable electronic device capable of communicating with digital assistant device 104, biometric sensor device 108, and other computing devices (not shown) within distributed data processing environment 100 via network 102. In another embodiment, server computer 112 represents a computing system utilizing clustered computers and components (e.g., database server computers, application server computers, etc.) that act as a single pool of seamless resources when accessed within distributed data processing environment 100. Server computer 112 includes digital assistant program 114 and database 116. Server computer 112 may include internal and external hardware components, as depicted and described in further detail with respect to FIG. 4.

Digital assistant program 114 analyzes a series of procedural instructions to derive characteristics of each instruction pertaining to productivity, accuracy, spatial ability, comprehension, and stress level. As used herein, procedural instructions are a list of two or more instructions with a required order. Digital assistant program 114 derives a user's ability to complete the procedural instructions, and derives a tempo range, i.e., beats per minute (bpm), to assign to background music to assist the user as the user completes the procedural instruction. Upon determining that a response to a request received from a user will include a series of procedural instructions, digital assistant program 114 determines an importance of various characteristics of each instruction and assigns a characteristic score. Digital assistant program 114 predicts a performance by the user of each instruction and determines a performance score. Digital assistant program 114 determines an optimal background music tempo for each instruction based on the characteristic score and the performance score. Digital assistant program 114 renders each instruction with the background music at the determined tempo. Digital assistant program 114 monitors the performance of the user, and if digital assistant program 114 determines the performance is above a threshold, then digital assistant program 114 adjusts the tempo of the background music to improve the performance of the user. In one embodiment, a series of procedural instructions can be a single instruction that may take the user a period of time to complete for which background music is appropriate. In another embodiment, a series of procedural instructions can be a group of unrelated tasks, for example, a to-do list. Digital assistant program 114 is depicted and described in further detail with respect to FIG. 2.

Database 116 is a repository for data used by digital assistant program 114. In the depicted embodiment, database 116 resides on server computer 112. In another embodiment, database 116 may reside on digital assistant device 104 or elsewhere within distributed data processing environment 100 provided digital assistant program 114 has access to database 116. A database is an organized collection of data. Database 116 can be implemented with any type of storage device capable of storing data and configuration files that can be accessed and utilized by digital assistant program 114, such as a database server, a hard disk drive, or a flash memory. Database 116 stores data used by digital assistant program 114, such as data collected by biometric sensor device 108. Database 116 may also store a corpus of historical performance data associated with a user's performance of a task in the past. Database 116 may also store a corpus of current performance data associated with a user's performance of a current task. Database 116 may also store user preferences, such as different styles of music that the user enjoys or types of tasks for which the user prefers no background music. Database 116 may also store a corpus of historical data associated with other users' performance of a plurality of tasks.

Figure 2:
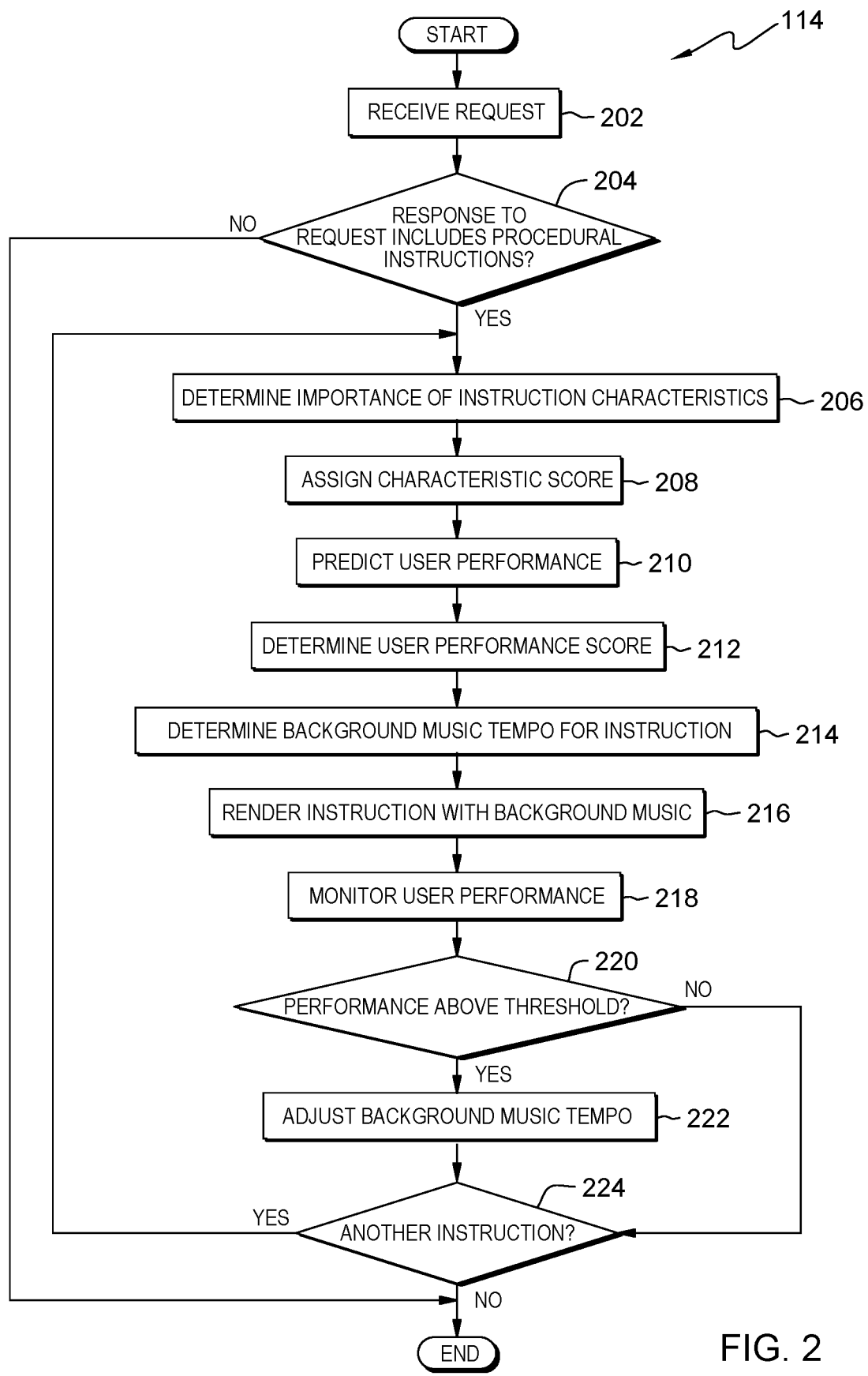
FIG. 2 is a flowchart depicting operational steps of a digital assistant program, on a server computer within the distributed data processing environment of FIG. 1, for determining background music tempo to accompany procedural instructions, in accordance with an embodiment of the present invention.

FIG. 2 is a flowchart depicting operational steps of digital assistant program 114, on server computer 112 within distributed data processing environment 100 of FIG. 1, for determining background music tempo to accompany procedural instructions, in accordance with an embodiment of the present invention.

Digital assistant program 114 receives a request (step 202). When a user of digital assistant device 104 gives a command via user interface 106, digital assistant program 114 receives a request. In one embodiment, the user gives the request in natural language by speaking to digital assistant device 104 via user interface 106. In another embodiment, digital assistant program 114 may receive the request when a user provides the request to user interface 106 via a keyboard or touch screen associated with digital assistant device 104.

Digital assistant program 114 determines whether a response to the request will include a series of procedural instructions (decision block 204). Digital assistant program 114 processes the request and determines whether the user is asking for instructions for performing a task. If digital assistant program 114 determines the response to the request will not include a series of procedural instructions ("no" branch, decision block 204), then digital assistant program 114 ends.

If digital assistant program 114 determines the response to the request will include a series of procedural instructions ("yes" branch, decision block 204), then digital assistant program 114 determines an importance of one or more instruction characteristics (step 206). As used herein, the term importance indicates a value of an instruction characteristic as the instruction characteristic relates to specific task. In an embodiment, instruction characteristics include, but are not limited to, one or more of productivity, accuracy, comprehension, spatial reasoning, and stress level. For example, regarding productivity, digital assistant program 114 determines a desirable speed for the user to perform the instruction. In another example, regarding accuracy, digital assistant program 114 determines the importance of the user performing the instruction completely accurately, i.e., digital assistant program 114 determines what impact there would be if the user commits an error while performing the instruction. In a further example, regarding comprehension, digital assistant program 114 determines the difficulty for the user to interpret the instruction. In yet another example, regarding spatial reasoning, digital assistant program 114 determines to what degree the instruction requires the user to apply spatial reasoning. In a further example, regarding stress level, digital assistant program 114 determines how stressful completion of the instruction may be for the user.

In an embodiment, digital assistant program 114 uses prior user performance to determine the importance of one or more characteristics. For example, digital assistant program 114 determines the impact on outcomes when the user performed this, or a similar, task in the past. Digital assistant program 114 may determine how fast the user performed the task in the past or at what stress level, based on data stored in database 116. For example, digital assistant program 114 may assess a stress level by retrieving biometric data associated with the user while the user performed the task in the past, such as heartrate, respiration, or perspiration levels, from database 116. Digital assistant program 114 can compare analyses of attributes of past task performances to the outcomes, i.e., determining if the user completed the task satisfactorily. Where observations match desired outcomes, digital assistant program 114 weights the associated instruction characteristics higher, for example, a task that was completed slowly and with low stress resulted in the user successfully completing the task. Additionally, digital assistant program 114 may weight instruction characteristics lower if the characteristics correlate with poor outcomes. In another embodiment, digital assistant program 114 may determine the importance of one or more characteristics based on an aggregate user performance. For example, digital assistant program 114 may consider the outcomes for completing the task across a plurality of users. By analyzing the results of a large quantity of users, digital assistant program 114 can base the determination on a larger corpus of observations to address tasks the user has not yet encountered, enabling a weighting of instruction characteristics to previous outcomes. In a further embodiment, a knowledge engineer previously trained digital assistant program 114 with desirable instruction characteristics for specific tasks. For example, tasks related to a password reset should always be performed deliberately and slowly to reduce error, at the expense of productivity. In another example, the knowledge engineer administers a plurality of diagnostic exams to a plurality of users to isolate which factors (e.g., productivity, accuracy, comprehension, spatial reasoning, and stress level) impacts the outcome of various tasks. The results of the exams are collected into a corpus of training data. In yet another embodiment, digital assistant program 114 may use one, two, all three of the above-named methods, or additional other methods to determine the importance of one or more instruction characteristics. Further, digital assistant program 114 can personalize some instruction characteristics, for example, comprehension is dependent on the user's skill or familiarity with an instruction. Other characteristics may depend on the task requirement versus the person performing the task, for example, how accurately a task must be completed may depend more on the activity than on the person performing the task.

In an embodiment, digital assistant program 114 analyzes the series of procedural instructions to derive structured text analytics. The text analytics may include category taxonomy, concepts, entities, and keywords. Category taxonomy relates the high-level category that the procedural instructions adhere to. For example, FIG. 3A depicts sample code for determining instructions related to software. Concepts relates to concepts contained within the procedural instructions. For example, FIG. 3B depicts sample code for determining concepts related to blockchain. Entities relates to people, places, organizations, and other entities contained within the procedural instructions. For example, FIG. 3C depicts sample code for determining entities related to a banking sector. Digital assistant program 114 also extracts keywords from the procedural instructions. For example, FIG. 3D depicts sample code for extracting keywords related to node configuration.

Digital assistant program 114 assigns a characteristic score (step 208). Digital assistant program 114 assigns a score, or ranking, to each instruction characteristic, based on the determined importance of the instruction characteristic. For example, if the instruction characteristics are productivity, accuracy, comprehension, spatial reasoning, and stress level, then digital assistant program 114 assigns a rank of one to five, where one is the least important characteristic for the instruction and five is the most important characteristic for the instruction. In another example, digital assistant program 114 may assign a rank of 0.0 to 1.0 to each of the instruction characteristics.

Digital assistant program 114 predicts user performance of the instruction (step 210). Digital assistant program 114 uses a plurality of data sources to predict user performance of the instruction. In one embodiment, digital assistant program 114 predicts user performance based on a previous experience by the user, retrieving historical performance data associated with the user from database 116 to analyze how well the user performed similar or related instructions in the past. For example, if the current instruction relates to changing a tire, digital assistant program 114 determines how the user responded to the instructions in one or more previous instances where digital assistant program 114 directed the user to perform the same or a similar task. Digital assistant program 114 may use the same textual analysis described with respect to step 206, and depicted in FIG. 3, for the analysis of historical performance of the user. In another embodiment, digital assistant program 114 predicts user performance based on current performance of instructions by the user. For example, if the current instruction is not the first in the current series of instructions, then digital assistant program 114 analyzes how well the user is performing other recently provided instructions. In a further embodiment, digital assistant program 114 predicts user performance based on biometric data collected by biometric sensor device 108. For example, if biometric sensor device 108 is a smart watch, then biometric sensor device 108 may collect data such as a heartrate, blood pressure, skin temperature, or the presence of perspiration of the user of biometric sensor device 108. Digital assistant program 114 retrieves the biometric data, either directly from biometric sensor device 108 or from database 116, and analyzes the retrieved data to determine a stress level of the user. In a further embodiment, digital assistant program 114 may predict user performance based on two or more user performance metrics, i.e., historical performance data, current performance data, and biometric stress data.

Digital assistant program 114 determines a user performance score (step 212). Digital assistant program 114 assigns a score, or ranking, to each user performance metric considered in the prediction of user performance. For example, if digital assistant program 114 determines the user's heartrate is rising in a non-physically strenuous activity, then digital assistant program 114 assigns a high score for the biometric stress metric. In another example, if digital assistant program 114 determines the user is currently following instructions well, then digital assistant program 114 assigns a high score to the current performance metric. In an embodiment, digital assistant program 114 aggregates the scores for each metric to determine a user performance measurement.

In one embodiment, digital assistant program 114 uses cognitive artificial intelligence (AI) to perform machine learning for analysis of the available data for both determination of instruction characteristic importance and prediction of the performance of an instruction by the user. Machine learning explores the study and construction of algorithms that can learn from and make predictions on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data. The cognitive AI system continuously learns about the user as it builds a custom knowledge base for the user, adding information to database 116 as the information is available and analyzed. As the knowledge base grows, the ability of digital assistant program 114 to accurately determine the importance of instruction characteristics and predict user performance increases. In an embodiment, digital assistant program 114 uses prior user performance to predict user performance. For example, digital assistant program 114 may determine how fast the user performed the task in the past or at what stress level, based on data stored in database 116. In another embodiment, digital assistant program 114 may use an aggregate user performance based on performance results across a plurality of users who have performed the same or similar task. By analyzing the results of a large quantity of users, digital assistant program 114 can base the determination on a larger corpus of data to address tasks the user has not yet encountered. In one embodiment, the cognitive AI system employs one or more neural networks to accomplish machine learning.

Digital assistant program 114 determines a background music tempo for the instruction (step 214). Based on the instruction characteristic score and the user performance score, digital assistant program 114 determines an appropriate tempo, i.e., beats per minute, of background music to play in association with the user performing a particular instruction. Digital assistant program 114 determines a combined score by comparing which attributes the instruction needs in order for the user to perform the instruction to the best of the ability of the user. For example, digital assistant program 114 determines background music with a high bpm for an instruction where a high degree of spatial reasoning is required unless, based on retrieved biometric data, digital assistant program 114 determines the user is currently experiencing a high stress level, in which case digital assistant program 114 determines background music with a lower bpm to minimize stress in the user.

Digital assistant program 114 renders the instruction with the associated background music (step 216). Digital assistant program 114 provides the instruction to the user, via user interface 106, and chooses and plays background music with the determined tempo for that instruction. In one embodiment, digital assistant program 114 chooses a song with a consistent tempo throughout. In another embodiment, digital assistant program 114 chooses multiple songs with the same tempo. In a further embodiment, digital assistant program 114 chooses portions of songs with the same tempo and strings them together, such that the tempo remains consistent. In one embodiment, digital assistant program 114 renders the instruction via spoken natural language. In another embodiment, digital assistant program 114 renders the instructions via displaying text on a screen or head mounted display. In one embodiment, digital assistant program 114 renders the instruction and plays the background music simultaneously. In another embodiment, digital assistant program 114 renders the instruction first, then plays the background music after the user has heard or read the instruction. In an embodiment, digital assistant program 114 may determine that a particular task requires deep concentration and mutes the background music. In an embodiment, digital assistant program 114 can determine whether the user is already listening to other content, such as a television or a radio. In the embodiment, digital assistant program 114 may ask the user if the user wants background music played in addition to the other audio. In addition, if the other audio devices are connected to network 102, then digital assistant program 114 may ask the user if the user would like digital assistant program 114 to mute the other devices. In one embodiment, after determining the appropriate tempo for an instruction, digital assistant program 114 may customize the length of the music to match the expected duration of the performance of each instruction, i.e., rather than playing a random portion of a piece of music, digital assistant program 114 "mixes," or edits, the piece to match the duration of the performance of the instruction. In an embodiment, digital assistant program 114 may choose more than one piece of music at the same tempo and continue providing the music until the user completes the task.

Digital assistant program 114 monitors user performance of the instruction (step 218). As the user performs the instruction, digital assistant program 114 monitors performance to determine whether to adjust the tempo of the background music. For example, digital assistant program 114 may monitor the current biometric data collected by biometric sensor device 108 to determine whether there is a change in the stress level of the user. In another example, digital assistant program 114 may monitor the duration of time required for the user to complete a task. In an embodiment where digital assistant device 104 includes a camera (not shown), digital assistant program 114 can observe the user performing the task using visual analytics and determine the user's performance. For example, digital assistant program 114 can observe the user performing a first pump, a "thumbs up", etc. In an embodiment, digital assistant device 104 may utilize a convolutional neural network to visually analyze how the user completes either the current task, or a previous task in the series of procedural instructions. In an embodiment where digital assistant device 104 includes a microphone (not shown), digital assistant program 114 can monitor for audio cues as to how well the user is performing the task. For example, digital assistant program 114 can use one or more natural language processing (NLP) techniques to monitor for sounds of frustration or an utterance of "yes!" "next," "complete," etc. In an embodiment, digital assistant program 114 monitors user performance of a series of instructions, either similar instructions from the past or the current series of instructions, to predict the outcome of the current instruction under various conditions. For example, if the user completes task 1 perfectly, task 2 at 90% efficiency, and task 3 at 70% efficiency, digital assistant program 114 can deduce a downward trend, and alter the tempo of the background music for task 4 accordingly, to optimize the result of task 4. In an embodiment, digital assistant program 114 may receive a prompt from the user upon the user successfully completing a task such that digital assistant program 114 confirms the task is complete and the user is ready for the next task in the series.

Digital assistant program 114 determines whether the user performance is above a threshold (decision block 220). Digital assistant program 114 may compare the user performance metrics to a plurality of thresholds to determine whether the user performance exceeds a threshold. For example, digital assistant program 114 may determine the heartrate of the user has increased significantly since the user started performing the instruction, thus the performance is above a biometric data point threshold. In another example, digital assistant program 114 may compare the duration of time required for the user to complete a task to historical data stored in database 116 to determine whether the user is struggling to complete the task, and therefore exceeding a duration of time threshold. In the example, in an embodiment where digital assistant program 114 includes a camera, digital assistant program 114 may use one or more facial recognition techniques to visually determine that the user is having difficulty completing a task by observing frustrated facial expressions or is easily completing a task by observing a happy expression.

If digital assistant program 114 determines the user performance is above a threshold ("yes" branch, decision block 220), then digital assistant program 114 adjusts the background music tempo (step 222). Continuing the above examples, digital assistant program 114 may decrease the tempo of the background music to lower the stress level of the user or increase the tempo of the background music to improve the productivity of the user. For example, digital assistant program 114 can choose a different piece of music to play, or digital assistant program 114 can slow the tempo of the currently playing music.

Responsive to adjusting the background music tempo, or if digital assistant program 114 determines the user performance is not above a threshold ("no" branch, decision block 220), then digital assistant program 114 determines whether there is another instruction in the series (decision block 224).

If digital assistant program 114 determines there is another instruction in the series ("yes" branch, decision block 224), then digital assistant program 114 returns to step 206. Digital assistant program 114 determines the background music tempo for each individual task in a series of procedural instructions. For example, if the series of instructions are for an exercise routine, then digital assistant program 114 assigns a different tempo to each step, i.e., a slow tempo for warming up, a fast tempo for the exercise portion, and a slow tempo for the cool down portion. In one embodiment, digital assistant program 114 determines the background music tempo for each instruction in a series all at once, prior to rendering the first instruction of the series and continuously monitors the users progress to determine if adjustments are necessary.

If digital assistant program 114 determines there is not another instruction in the series ("no" branch, decision block 224), then digital assistant program 114 ends.

Figure 4:
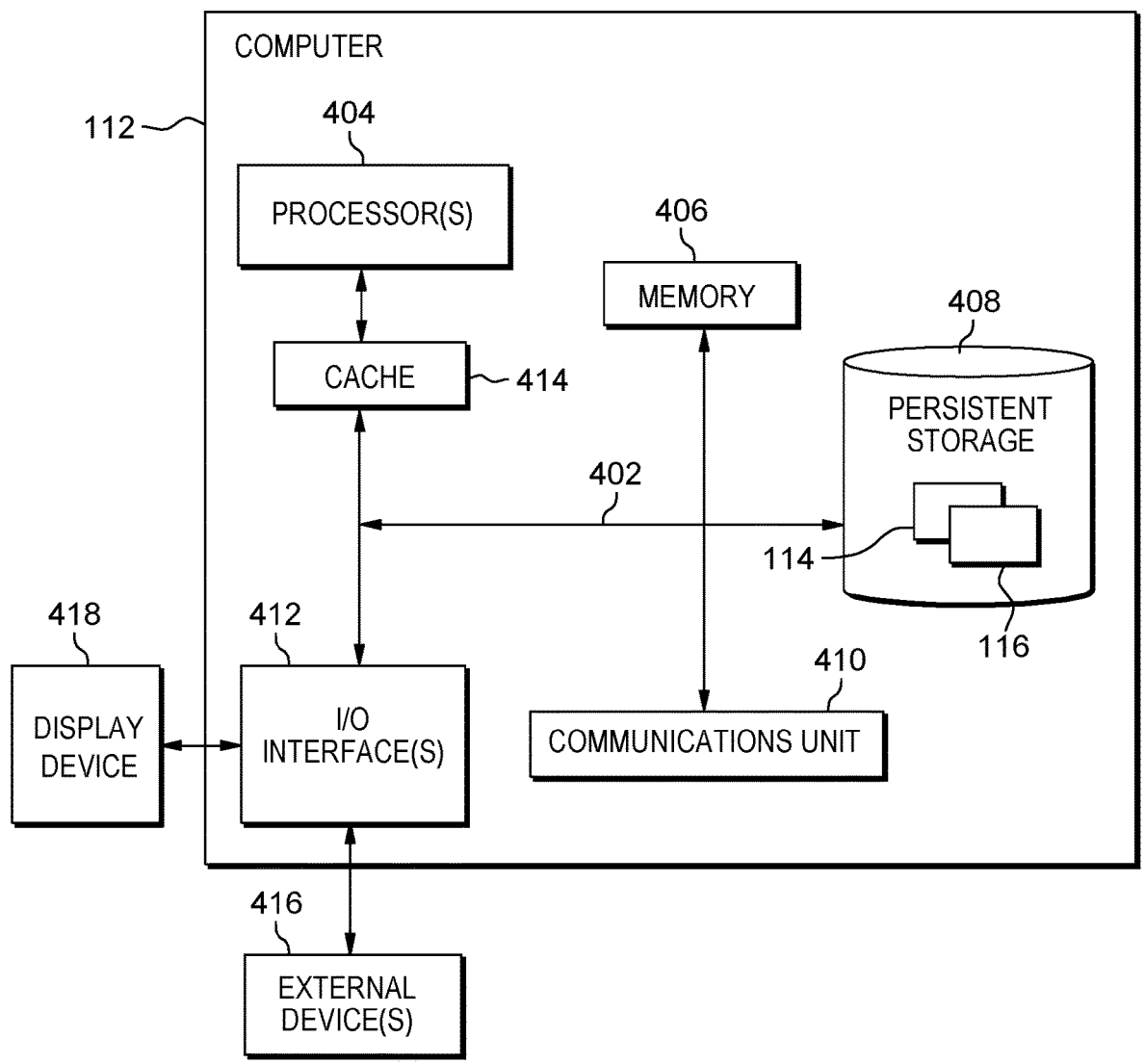
FIG. 4 depicts a block diagram of components of the server computer executing the digital assistant program within the distributed data processing environment of FIG. 1, in accordance with an embodiment of the present invention.

FIG. 4 depicts a block diagram of components of server computer 112 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 112 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., digital assistant program 114 and database 116, are stored in persistent storage 408 for execution and/or access by one or more of the respective processor(s) 404 of server computer 112 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of digital assistant device 104 and biometric sensor device 108. In these examples, communications unit 410 includes one or more network interface cards. Communications unit 410 may provide communications through the use of either or both physical and wireless communications links. Digital assistant program 114, database 116, and other programs and data used for implementation of the present invention, may be downloaded to persistent storage 408 of server computer 112 through communications unit 410.

I/O interface(s) 412 allows for input and output of data with other devices that may be connected to server computer 112. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., digital assistant program 114 and database 116 on server computer 112, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a background music tempo, the method comprising:
receiving, by one or more computer processors, a request from a user;
determining, by the one or more computer processors, a response to the request will include an action to be performed by the user;
determining, by the one or more computer processors, a ranking of one or more instruction characteristics associated with a first instruction;
predicting, by the one or more computer processors, a performance of the first instruction by the user;
based, at least in part, on the determined ranking of the one or more instruction characteristics associated with the first instruction and the predicted performance of the first instruction by the user, determining, by the one or more computer processors, a beats per minute range for music to accompany performance of the first instruction; and
rendering, by the one or more computer processors, the first instruction and a musical selection associated with the first instruction, wherein the background music is at the determined beats per minute range.

2. The method of claim 1, wherein the one or more instruction characteristics are selected from the group consisting of: a productivity, an accuracy, a spatial ability, a comprehension, and a stress level.

3. The method of claim 1, further comprising, assigning, by the one or more computer processors, a characteristic score to each of the one or more instruction characteristics, wherein the characteristic score is a ranking of a value of each of the one or more instruction characteristics.

4. The method of claim 1, further comprising, determining, by the one or more computer processors, a user performance score associated with the first instruction, wherein the user performance score is a ranking of two or more user performance metrics considered in the predicted user performance.

5. The method of claim 4, wherein the two or more user performance metrics are selected from the group consisting of: historical performance data, current performance data, and biometric stress data.

6. The method of claim 1, further comprising:
monitoring, by the one or more computer processors, a performance of the first instruction by the user;
determining, by the one or more computer processors, whether the performance exceeds a threshold; and
responsive to determining the performance exceeds the threshold, adjusting, by the one or more computer processors, the tempo of the background music.

7. The method of claim 6, wherein the threshold is selected from the group consisting of:
a duration of time and a biometric data point.

8. A computer program product for determining a background music tempo, the computer program product comprising:
one or more computer readable storage devices and program instructions stored on the one or more computer readable storage devices, the stored program instructions comprising:
program instructions to receive a request from a user;
program instructions to determine a response to the request will include an action to be performed by the user;
program instructions to determine a ranking of one or more instruction characteristics associated with a first instruction;
program instructions to predict a performance of the first instruction by the user;
based, at least in part, on the determined ranking of the one or more instruction characteristics associated with the first instruction and the predicted performance of the first instruction by the user, program instructions to determine a beats per minute range for music to accompany performance of the first instruction; and program instructions to render the first instruction and a musical selection associated with the first instruction, wherein the background music is at the determined beats per minute range.

9. The computer program product of claim 8, wherein the one or more instruction characteristics are selected from the group consisting of: a productivity, an accuracy, a spatial ability, a comprehension, and a stress level.

10. The computer program product of claim 8, the stored program instructions further comprising, program instructions to assign a characteristic score to each of the one or more instruction characteristics, wherein the characteristic score is a ranking of a value of each of the one or more instruction characteristics.

11. The computer program product of claim 8, the stored program instructions further comprising, program instructions to determine a user performance score associated with the first instruction, wherein the user performance score is a ranking of two or more user performance metrics considered in the predicted user performance.

12. The computer program product of claim 11, wherein the two or more user performance metrics are selected from the group consisting of: historical performance data, current performance data, and biometric stress data.

13. The computer program product of claim 8, the stored program instructions further comprising:
program instructions to monitor a performance of the first instruction by the user;
program instructions to determine whether the performance exceeds a threshold; and
responsive to determining the performance exceeds the threshold, program instructions to adjust the tempo of the background music.

14. The computer program product of claim 13, wherein the threshold is selected from the group consisting of: a duration of time and a biometric data point.

15. A computer system for determining a background music tempo, the computer system comprising:
one or more computer processors;
one or more computer readable storage devices;
program instructions stored on the one or more computer readable storage devices for execution by at least one of the one or more computer processors, the stored program instructions comprising:
program instructions to receive a request from a user;
program instructions to determine a response to the request will include an action to be performed by the user;
program instructions to determine a ranking of one or more instruction characteristics associated with a first instruction;
program instructions to predict a performance of the first instruction by the user;
based, at least in part, on the determined ranking of the one or more instruction characteristics associated with the first instruction and the predicted performance of the first instruction by the user, program instructions to determine a beats per minute range for music to accompany performance of the first instruction; and
program instructions to render the first instruction and a musical selection associated with the first instruction, wherein the background music is at the determined beats per minute range.

16. The computer system of claim 15, wherein the one or more instruction characteristics are selected from the group consisting of: a productivity, an accuracy, a spatial ability, a comprehension, and a stress level.

17. The computer system of claim 15, the stored program instructions further comprising, program instructions to assign a characteristic score to each of the one or more instruction characteristics, wherein the characteristic score is a ranking of a value of each of the one or more instruction characteristics.

18. The computer system of claim 15, the stored program instructions further comprising, program instructions to determine a user performance score associated with the first instruction, wherein the user performance score is a ranking of two or more user performance metrics considered in the predicted user performance.

19. The computer system of claim 18, wherein the two or more user performance metrics are selected from the group consisting of: historical performance data, current performance data, and biometric stress data.

20. The computer system of claim 15, the stored program instructions further comprising:
program instructions to monitor a performance of the first instruction by the user;
program instructions to determine whether the performance exceeds a threshold; and
responsive to determining the performance exceeds the threshold, program instructions to adjust the tempo of the background music.

* * * * *